May 8, 1973  R. L. IGNELL  3,732,348
METHOD FOR THE PRODUCTION OF A STRIP OF LAMINATE MATERIAL
FROM A MATERIAL CAPABLE OF BEING HEAT FORMED
Filed May 12, 1969
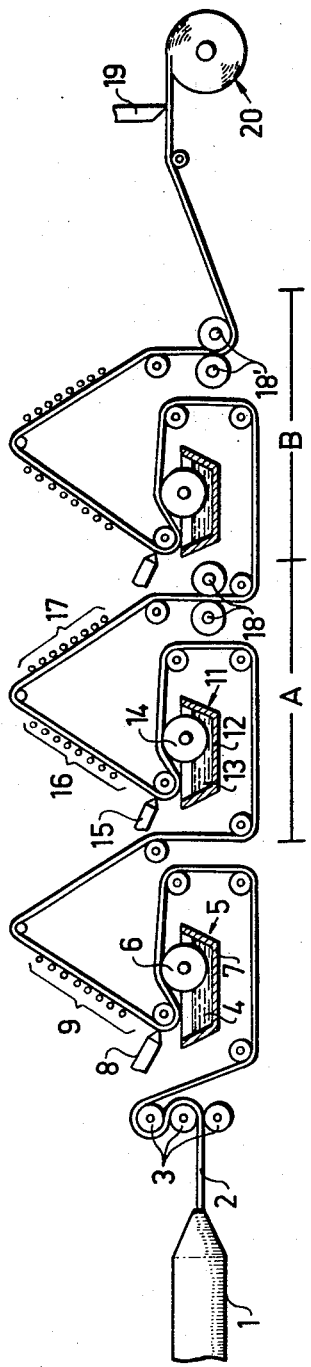
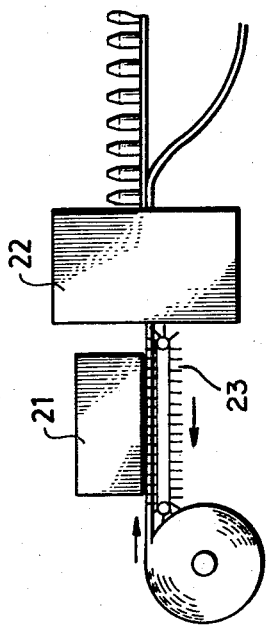
INVENTOR
Rolf Lennart Ignell
By
Pierce, Scheffler & Parker
Attorneys United States Patent Office 3,732,348
Patented May 8, 1973

3,732,348
METHOD FOR THE PRODUCTION OF A STRIP OF LAMINATE MATERIAL FROM A MATERIAL CAPABLE OF BEING HEAT FORMED
Rolf Lennart Ignell, Lund, Sweden, assignor to Sobrefina SA, Fribourg, Switzerland
Filed May 12, 1969, Ser. No. 823,593
Claims priority, application Sweden, May 21, 1968, 6,841/68
Int. Cl. B29d 7/22; B44d 1/092, 1/16
U.S. Cl. 264—134                                  9 Claims

ABSTRACT OF THE DISCLOSURE

A method for producing laminated strip material by applying at least one layer of a polymer to a different base polymer layer and heating the composite layers to sinter the layers together, the heated composite layer being capable of being formed into objects.

---

This invention relates to a method for the production of a strip of laminate material from a material capable of being heat formed, which is intended for the production of objects by means of a heat forming process, the strip of material containing at least one layer of polyvinylchloride and one or more layers of polyvinylidene chloride applied onto this layer. The invention further relates to equipment to be used for carrying out this method.

Plastic materials of various kinds, as is well known, have found wide application in for instance packaging technology. Polyvinylchloride is for instance such a material that has excellent deep-drawing characteristics, which means that it can be easily formed by means of for instance vacuum drawing, in which process a film of the material heated to plasticity is drawn down into a pre-produced die of the desired shape by the use of suction.

One drawback of polyvinylchloride material is that in some cases it does not satisfy the requirements as regards impermeability to vapours and gases, which means that the material cannot be used for packages that require a high degree of impermeability.

One material which possesses good permeability characteristics but has not, on the other hand, the forming characteristics of polyvinylchloride, and which is in addition considerably more expensive, is polyvinylidene chloride. In order therefore to improve the permeability caracteristics of polyvinylchloride, it would seem obvious that attempts should be made to produce a laminate of polyvinylchloride and polyvinylidene chloride that is capable of being deep-drawn. Attempts have been made to produce such a laminate, but the laminate material obtained was found to lack the characteristics sought.

One problem in the production of a strip of material comprising layers of polyvinylchloride and polyvinylidene chloride is that the polyvinylidene chloride must be subjected to a comparatively high degree of heating in order that it should be sintered and form a homogenous and unbroken coating on the layer of polyvinylchloride. This sintering temperature namely greatly exceeds the temperature at which polyvinylchloride is stable, and completely satisfactory adhesion between a polyvinylchloride layer and a polyvinylidene chloride layer cannot be achieved unless the above temperature greatly exceeds the stability temperature of polyvinylchloride.

Another problem also arises in this connection, namely the difficulty of obtaining sufficient adhesion between polyvinylchloride and the layer of polyvinylidene chloride. It has been established that a high heating temperature for a short time produces more satisfactory sintering and considerably better adhesion than is the case with a lower heating temperature for a longer period, even if the same thermal capicity is used.

Several attempts have been made to solve these problems. In one instance, an attempt was made to cool the layer of polyvinylchloride in such a way that a strip of polyvinylchloride was allowed to run over a cooling roll, the strip having the layer of polyvinylidene chloride on that side of the strip that was turned away from the cooling roll. It was found however that the strip of polyvinylchloride was still deformed, by the strip becoming wrinkled and puckered, and by shrinking.

In order to solve the problem of adhesivity between the layer of polyvinylchloride and the layer of polyvinylidene chloride, attempts have been made to use adhesion-promoting agents such as solutions, solvents which are solvents for both polyvinylchloride and polyvinylidene chloride being applied to a strip of polyvinylchloride. The surface layer of the strip of polyvinylchloride will be dissolved in this way before the polyvinylidene chloride is laid onto the strip. It has been found however that this method does not produce satisfactory adhesion between the layers. The adhesivity can however be improved by the use of suitable adhesion-promoting agents and/or by pre-treating the layer of polyvinylchloride before the polyvinylidene chloride is applied. The temperature still seems to be of decisive importance, however, in order that satisfactory adhesion should be obtained between the layers, in which connection account must be taken of the temperature sensitivity of polyvinylchloride. The most usual method of applying a coating of polyvinylidene chloride to polyvinylchloride, for instance in the form of a film or strip, is to use varnishing, i.e. to aply a coating of varnish comprising polyvinylidene chloride and a solvent. This method can be used to apply a layer of polyvinylidene chloride onto a completed polyvinylchloride part or a strip of polyvinylchloride, but it has been found that known solvents for polyvinylidene chloride are also solvents for polyvinylchloride, which means that the polyvinylidene chloride varnish is dissolved in the surface of the polyvinylchloride, and a homogenous surface layer of polyvinylidene chloride is not obtained therefore, but rather a surface layer containing a mixture of polyvinylchloride and polyvinylidene chloride. The permeability characteristics sought are lost in this way. An emulsion coating of polyvinylidene chloride on polyvinylchloride has not the above disadvantages, but an emulsion coating does not provide sufficiently good adhesion between the coating layer and the base in a deep-drawing process, which process naturally entails high stresses on the laminate. Deep-drawing of a layer of polyvinylchloride coated with emulsion in the conventional manner results in most cases in rupture of the layer of polyvinylidene chloride emulsion, whereby the layer of emulsion no longer forms a continuous coating but splits up into a "grid." Such a surface coating that does not adhere uniformly naturally cannot result in any great degree of improvement in the impermeability of the laminate.

It has however been possible to avoid the above drawbacks by making use of a process in accordance with the invention, which is characterised by the layer or layers of polyvinylidene chloride, simultaneously with a heating of the strip of material to a temperature necessary for the heat forming process, and in the same heating process, being caused by heating to be sintered to form a homogeneous coating layer on the layer of polyvinylchloride, the strip of material, at least during the heating process, being held along the edges of the strip with the object of preventing deformation and/or shrinkage of the strip due to its being heated.

The invention also relates to equipment to be used for the process. The equipment in this connection relates principally to a heating unit placed in the vicinity of the surface of the strip of material, for heating of the strip of material to the temperature necessary for the heat forming process and the sintering, and to devices for holding the edges of the strip of material with the object of preventing deformation and/or shrinkage of the strip while it is heated up to the temperature for the heat forming process and sintering.

One constructional example of the invention will be described below by reference to the attached diagrammatic drawing, in which FIG. 1 shows an installation for producing the strip of laminate material, and FIG. 2 shows a machine where the strip of laminate material is given finishing treatment prior to the heat forming process.

For the sake of clarity, the drawing and the equipment and components shown in the figures will be described first of all, after which the actual method with the invention will be described.

Reference 1 in FIG. 1 denotes an extruder device, i.e. a device in which plastic material in the form of a granulate or powder is melted by the application of heat and is thereafter extruded at high pressure through a narrow nozzle so as to form a continuous plastic foil 2. The thickness of the extruded plastic foil 2 naturally depends on the width of the extruder nozzle which can naturally be varied. Immediately after extrusion, the plastic film extruded from the nozzle is plastic, by virtue of the fact that it has a temperature higher than the softening temperature of the plastic material, and in order to stabilise the plastic film it is usual to pass this over rolls which also have the task of giving the extruded film of plastic an even surface. A set of three rolls is denoted 3 in the figure. The cooling effect of the rolls 3 can naturally be regulated by controlling their surface temperatures, and it is stipulated in this case that the rolls 3 are fitted with a means of regulating temperature.

A device for applying an adhesion-promoting agent or special primer 4 onto the extruder strip 2 is denoted 5. This device may consist of a roll 6 which is partly situated in the adhesion-promoting agent 4 which is contained in a tank 7. Application of the primer 4 may also be effected by other suitable means, for instance by means of a spreader device or a spray unit.

Above the tank 7, there is fitted a nozzle 8 for a pressurised agent, for instance a gas under pressure such as air. The nozzle 8 is directed towards the strip 2 at an angle, so that excess primer is returned to the tank 7. The primer 4, which may be an emulsion with for instance polyacrylic esters, is namely applied in an excessive quantity, whereby the air jet 8 regulates the thickness of the applied primer and ensures that an even coating is obtained.

Reference 9 denotes a number of heating units situated one after the other along the strip 2. The heating units 9, which may be electric radiant elements, are intended primarily for removal of the emulsion fluid by evaporation. After heating, dry substance is left behind in the form of a coating covering completely the strip 2.

A coating stage in the installation is further shown in the figure by the designation A, in which stage there are included for instance a device 11 for applying emulsion to the strip 2. The emulsion consists of polyvinylidene chloride and for instance water as the emulsion fluid. The device 11 itself consists of a tank 12 for the emulsion 13 and a roll 14. There is a nozzle 15 fitted above the tank similar to the nozzle 8 shown earlier.

There are further fitted a number of heating units 16 and 17 in two groups along the strip 2, which may consist of electric radiant elements. The primary duty of the heating units is to remove the emulsion fluid from the emulsion 13 by evaporation. There is a pair of rolls 18 fitted beyond the heating units 17. Since the rolls 18 are not heated they are naturally cooler than the temperature of the strip 2 as it leaves the heating units 17 and therefore act as cooling rolls as well as smoothing rolls. The pair of rolls 18 presses on against the strip 2 and is intended to effect smoothing as well as cooling of the polyvinylidene chloride layer applied onto the strip 2, the roll which bears against the layer of polyvinylidene chloride having a polished and smooth surface. The stage B shown after this on the drawing is identical with stage A. Stage B is thus concluded by smoothing and cooling rolls 18'.

In front of a storage roll 20, onto which the strip coated with polyvinylidene chloride is rolled up, there are knives 19 fitted on each side of the strip to cut the edges of the strip.

FIG. 2 shows a forming machine in which the strip of laminate material 2 is given finishing treatment prior to the heating forming process, and is also subjected to a heat forming process in order to produce heat-formed objects, such as packages. Above the strip 2, there is fitted a heating unit 21. The heating unit contains electric radiant elements of an output such that satisfactory sintering of the polyvinylidene chloride layer is achieved and the strip of alminate is also heated to the temperature required for the heat forming process. Reference 22 shows the forming part of the machine, in which the strip of material is subjected to the said heat forming process with a view to making products, the heated-up material being drawn into a previously prepared form with the aid of suction, blowing or by means of a plunger.

In order that the material should not be deformed and/or shrink during the comparatively high degree of heating to which the strip is subjected by the heating unit 21, the strip is held along the edges by special equipment. The equipment consists of devices, for instance needle or tooth-shaped devices, thrust through the edges of the strip of material, which may with advantage be fitted on endless chains running underneath the two edges of the strip of material as shown schematically at 23 in FIG. 2. Apart from holding the strip, this equipment also has the duty of moving or feeding forward the strip to the forming part 22.

The procedure in producing the laminate material is as follows: A comparatively thick strip or film 2 of polyvinylchloride is first extruded in the conventional way with the aid of the extruder 1. The thickness of this strip must naturally be related to the desired thickness of the fial product processed by deep-darwing, taking into account the fact that the deep-drawing process causes appreciable reduction in the thickness of the deep-drawn material.

After the extruder 1, the strip 2 is fed through three interacting rolls 3, during which process the still hot and plastic film is cooled down somewhat, and at the same time its surface is smoothed and the strip is given the desired thickness.

In this case, it is stipulated that the strip, immediately after extrusion, has a temperature of approximately 170–180° C. and a thickness of between 0.6 and 2.0 mm. No attempt is made to effect thorough cooling of the strip 2, but since the strip 2 immediately after extrusion is so plastic that it cannot be passed through the machinery without there arising in it uncontrollable deformations, the strip must be cooled down to such an extent that it has sufficient stability. The temperature of the strip 2 beyond the cooling rolls can be regulated, as referred to earlier, by the cooling capacity of the rolls 3 being capable of adjustment to a suitable value.

When the strip 2 has passed the cooling rolls 3, it is taken past a device 5 for the application of an emulsion 4 containing an adhesion-promoting agent or a special primer. The emulsion is applied onto the strip of polyvinylchloride by the roll 6 and onto the side of the strip which is later on to be coated by polyvinylidene chloride, since the emulsion agent is intended to promote adhesion of the polyvinylidene chloride to the strip of polyvinylchloride.

After passing the nozzle 8, where, inter alia, the excess emulsion is removed, the strip 2 passes the heating units 9. The primary duty of the heating units is to remove the emulsion fluid by means of evaporation, after which the adhesion-promoting agent is left behind on the strip 2 as a dry substance in a layer that covers the whole strip.

The strip 2 is thereafter taken into the treatment stage A shown in FIG. 1. While here, the strip is coated by the roll 14 with an emulsion containing polyvinylidene chloride. The thickness of the coating layer should be approximately 0.30–0.05 mm. in this case. Since the emulsion is liquid, it is probably impossible to apply a thicker coating successfully in one coating operation. On the other hand, however, it is naturally possible to repeat the emulsion-coating process a number of times if a thicker coating layer is to be obtained. After passing the nozzle 15, which can regulate the thickness of the emulsion coating and cause this coating to be even, the strip passes heating units 16 and 17, whereby the emulsion fluid is caused to evaporate so that the strip of polyvinylchloride receives a coating layer of polyvinylidene chloride. After this, the layer of polyvinylidene chloride applied is subjected to smoothing by passing the strip of material through smoothing rolls 18, which press against the strip so that the coating layer is given a polished and smooth surface.

By repeating the coating operation described above, a thicker coating layer may be obtained if desired, but it is naturally also possible to intentionally apply a thinner coating layer in a first coating operation and thereafter by repeated coating processes to obtain approximately the same thickness of coating layer that could have been obtained after only one coating. The most natural method in the present case is that the emulsion coating process is repeated several times, which is shown in FIG. 1 by the coating stage B.

Before the strip is rolled up onto the storage roll 20, its edges are cut by the knives 19. The polyvinylidene chloride layer may have become sintered and even formed a continuous layer by this stage of the treatment. The adhesion between the layer of polyvinylidene chloride and the strip of polyvinylchloride is however not staisfactory—this is due to the fact that the strip of material has been running free during the previous stages of treatment and could not therefore be subjected to sufficient heating without the strip becoming deformed as a result. Final treatment of the strip therefore takes place in the forming machine shown in FIG. 2.

In the forming machine, the strip of polyvinylchloride coated with polyvinylidene chloride is heated to the temperature necessary for the heat forming process by means of the heating unit 21. Simultaneously and in the same heating process, the polyvinylidene chloride layer is heated to such a temperature that sintering takes place, whereby the polyvinylidene chloride is fused by heating into a continuous, homogeneous coating layer. Satisfactory adhesion is furthermore obtained by the heating between the polyvinylchloride and the polyvinylidene chloride layer of the strip of material. A certain fusion of the surface layers, which are turned one against the other, also takes place at this stage.

The comparatively thick laminate material, which has been produced in accordance with the method described above, has been heated up to the softening temperature by the heating process and is thereby ready for use, i.e. the strip of material or a selected part thereof is subjected to a deep drawing or vacuum forming operation in the forming part 22, with production of heat-formed objects as a result. Owing to the good adhesion between the layer of polyvinylchloride and the layer of polyvinylidene chloride, only a reduction in the thickness of the material takes place, and ruptures in the polyvinylidene chloride layer can therefore be avoided.

During the said heating process in the forming machine, the material is subjected to a comparatively high degree of heating, and steps must therefore be taken to prevent deformation and/or shrinkage of the strip. These steps consist in holding the strip by means of the special equipment such as 23 in accordance with the invention, which has been described earlier in connection with the introduction of the equipment as per FIG. 2.

The above description is intended only to illustrate suitable equipment and a suitable procedure in carrying out the idea of the invention, and it is naturally possible to modify a number of details within the framework of the invention. It is thus possible to coat both sides of the strip of polyvinylchloride with a layer of polyvinylidene chloride. It has further been found best that the strip should undergo cleansing or washing before the adhesion-promoting agent is applied to it and/or it is coated with the polyvinylidene chloride emulsion. The aim of this cleansing is to remove the layer of wax or grease which the strip has after extrusion, and the objective is to improve the adhesion of the layer of polyvinylidene chloride or the adhesion-promoting agent, if such is used. An alcohol, such as methyl alcohol, may be used as the cleansing agent. It is furthermore not necessary that the emulsion fluid should consist of water as has been mentioned above, even though it has been found in the present case to be a good and inexpensive emulsion fluid. Finally, it may be mentioned that it is possible to construct the equipment for application of the adhesion-promoting agent and the polyvinylidene chloride emulsion, as well as the heating unit for sintering the polyvinylidene chloride layer in a number of ways, but the arrangement described has been found simple and it gives satisfactory results.

I claim:

1. The method for producing a laminated strip of diverse polymeric materials capable of being heat formed into objects comprising applying an agent for promoting adhesion between homopolyvinyl chloride and homopolyvinylidene chloride to a strip of homopolyvinyl chloride, applying at least one layer of an emulsion of homopolyvinylidene chloride to said adhesion promoting agent, heating said strip to remove the emulsifying agent, further heating said laminated strip to a temperature exceeding that at which homopolyvinyl chloride is normally deformed and at which said strip can be formed into objects, said temperature being sufficient to cause the at least one layer of homopolyvinylidene chloride to be sintered to form a homogenous layer of homopolyvinylidene chloride on the homopolyvinyl chloride strip and to perfect adhesion between the layer of homopolyvinylidene chloride and the strip of homopolyvinyl chloride, and holding said laminated strip along its edges while being further heated to prevent any substantial deformation of the strip.

2. A method as claimed in claim 1 wherein the step of heating the laminate for heat forming produces a substantially permanent adhesion between the polyvinyl chloride and the polyvinylidene chloride.

3. A method as claimed in claim 1 wherein a plurality of layers of polyvinylidene chloride emulsion are applied in succession to the strip of polyvinylchloride and wherein the emulsion fluid is evaporated by heating said strip after each application.

4. A method as claimed in claim 1 wherein at least one layer of polyvinylidene chloride emulsion is applied to each side of the strip of polyvinylchloride.

5. A method as claimed in claim 1 and further comprising smoothing and cooling the strip, after application of the emulsion of polyvinylidene chloride and after evaporation of the emulsion fluid therefrom.

6. A method as clamed in claim 1 wherein the emulsion fluid is water.

7. A method as claimed in claim 1 and further comprising cleaning the polyvinylchloride strip with a grease dissolving agent before applying the adhesion promoting agent thereto.

8. A method as claimed in claim 7 wherein the grease dissolving agent comprises methyl alcohol.

9. A method as claimed in claim 1 wherein the adhesion promoting agent is applied in the form of an emulsion, and further comprising heating the strip after application of the agent to evaporate the emulsion fluid therefrom before applying the at least one layer of an emulsion of polyvinylidene chloride.

References Cited

UNITED STATES PATENTS

| | | | |
|---|---|---|---|
| 3,353,992 | 11/1967 | Grenley et al. | 117—138.8 U |
| 3,459,582 | 8/1969 | Swerlick | 117—47 A |
| 3,255,099 | 6/1966 | Wolinski | 117—47 A |
| 3,322,553 | 5/1967 | Seifried et al. | 117—122 H |
| 3,457,101 | 7/1969 | Hermitte et al. | 117—7 |
| 3,458,334 | 7/1969 | Wallenfels | 117—7 |
| 2,160,933 | 6/1939 | Wiley | 260—80 |

OTHER REFERENCES

Schildknecht: Vinyl and Related Polymers, pp. 448 to 453 (1952), John Wiley & Sons Inc., publishers.

Smith: Vinyl Resins, Reinhold Publishing Corp. (1958), pp. 78 to 81.

WILLIAM D. MARTIN, Primary Examiner

M. SOFOCLEOUS, Assistant Examiner

U.S. Cl. X.R.

264—92; 117—8, 47 A, 72, 76 F, 122 H, 138.8 U, 161 UF, 161 UZ; 161—254